(12) United States Patent
Ellis et al.

(10) Patent No.: US 7,871,518 B2
(45) Date of Patent: Jan. 18, 2011

(54) APPARATUS FOR TREATING WASH WATER SUPPLIED

(75) Inventors: Walter B. Ellis, Jupiter, FL (US); Ronald G. Fink, Jupiter, FL (US); R. Paul Beam, Knoxville, TN (US); Neal Morris, Greenville, TN (US)

(73) Assignee: DBG Group Investments, LLC, Dallas, TX (US)

( * ) Notice: Subject to any disclaimer, the term of this patent is extended or adjusted under 35 U.S.C. 154(b) by 1262 days.

(21) Appl. No.: 11/389,678

(22) Filed: Mar. 27, 2006

(65) Prior Publication Data

US 2006/0163135 A1    Jul. 27, 2006

(51) Int. Cl.
*B01D 29/00* (2006.01)

(52) U.S. Cl. .............................. 210/251; 422/22; 422/24

(58) Field of Classification Search ................. 210/251, 210/748.01–748.1; 422/22, 24, 186.3
See application file for complete search history.

(56) References Cited

U.S. PATENT DOCUMENTS

| | | | |
|---|---|---|---|
| 3,868,968 A | 3/1975 | Fuhrmann | 137/624.18 |
| 4,099,912 A | 7/1978 | Ehrlich | 8/137 |
| 4,784,666 A | 11/1988 | Brenner et al. | 8/137 |
| 5,114,426 A | 5/1992 | Milora et al. | 8/102 |
| 5,125,247 A | 6/1992 | Mills | 68/208 |
| 5,313,981 A | 5/1994 | Gonzalez | 137/595 |
| 5,467,492 A | 11/1995 | Chao et al. | 8/159 |
| 5,471,692 A | 12/1995 | Wasinger et al. | 8/159 |
| 5,493,743 A | 2/1996 | Schneider et al. | 8/149.2 |
| 5,503,175 A | 4/1996 | Ravilious et al. | 137/1 |
| 5,536,400 A * | 7/1996 | Schultz | 210/192 |
| 5,613,983 A | 3/1997 | Terry et al. | 8/102 |
| 5,625,915 A | 5/1997 | Radler et al. | 8/158 |
| 5,765,403 A * | 6/1998 | Lincoln et al. | 68/13 R |

(Continued)

FOREIGN PATENT DOCUMENTS

CN    1255880    6/2000

(Continued)

OTHER PUBLICATIONS

SilverCare™ Technology, Samsung Electronics America, Consumer Electronics, 105 Challenger Road, Ridgefield Park, NJ 07660 (washing machines, The SilverCare™ Advantage—Silver Care™ Wash,—How Does It Work?, and Energy Efficient) (for purposes of this statement, believed to be prior to Mar. 27, 2006).

(Continued)

*Primary Examiner*—Walter D Griffin
*Assistant Examiner*—Cameron J Allen
(74) *Attorney, Agent, or Firm*—Klemchuk Kubasta LLP; Darin M. Klemchuk

(57) ABSTRACT

Apparatus for providing activated treated water to washing machines with a water treatment conduit connected between a water supply and an inlet of the washing machine, having a reactor chamber with a UV lamp and a coated metal target that generates oxidizing gases that communicate by an injector into the conduit and a transparent portion of the conduit treats the oxidated water by illumination from the UV lamp. A disinfector injects disinfecting silver ions into the treated oxidated water. A controller activates the apparatus during flow of water through the conduit. A method of activating and treating water for washing machines is disclosed.

25 Claims, 2 Drawing Sheets

U.S. PATENT DOCUMENTS

| | | | |
|---|---|---|---|
| 5,794,290 A | 8/1998 | Roberts | 8/159 |
| 5,806,120 A | 9/1998 | McEachern | 8/158 |
| 5,940,988 A | 8/1999 | Eisen | 34/596 |
| 5,968,202 A | 10/1999 | Verbiest et al. | 8/137 |
| 5,978,994 A | 11/1999 | Anderson | 8/158 |
| 5,996,155 A | 12/1999 | Chao et al. | 8/158 |
| 6,003,536 A | 12/1999 | Polverari et al. | 137/15 |
| 6,006,387 A | 12/1999 | Cooper et al. | 8/158 |
| 6,021,536 A | 2/2000 | Wasinger et al. | 8/159 |
| 6,115,862 A | 9/2000 | Cooper et al. | 8/158 |
| 6,117,190 A | 9/2000 | Chao et al. | 8/137 |
| 6,219,871 B1 | 4/2001 | Frederick et al. | 8/159 |
| 6,287,431 B1 | 9/2001 | Murphy et al. | 204/258 |
| 6,303,085 B1 | 10/2001 | Kwak et al. | 422/186.07 |
| 6,308,356 B1 | 10/2001 | Frederick et al. | 8/158 |
| 6,327,731 B2 | 12/2001 | Back et al. | 8/158 |
| 6,389,852 B1 | 5/2002 | Montgomery | 68/12.02 |
| 6,408,471 B1 | 6/2002 | Teran et al. | 8/158 |
| 6,418,580 B1 | 7/2002 | Teran et al. | 8/158 |
| 6,460,211 B1 | 10/2002 | Chapman | 8/158 |
| 6,507,965 B2 | 1/2003 | Kown | 8/158 |
| 6,596,092 B1 | 7/2003 | Satoh et al. | 134/26 |
| 6,612,323 B1 | 9/2003 | Horne | 137/1 |
| 6,620,210 B2 | 9/2003 | Murphy et al. | 8/149.1 |
| 6,673,121 B2 | 1/2004 | Mettlach et al. | 8/149.1 |
| 6,898,951 B2 | 5/2005 | Severns et al. | 68/5 C |
| 2004/0025263 A1 | 2/2004 | Kim et al. | 8/159 |
| 2004/0112838 A1* | 6/2004 | Martin | 210/739 |
| 2004/0117919 A1* | 6/2004 | Conrad et al. | 8/137 |
| 2004/0205899 A1 | 10/2004 | Park et al. | 8/159 |
| 2005/0072195 A1 | 4/2005 | McEachern | 68/12.01 |

FOREIGN PATENT DOCUMENTS

| | | |
|---|---|---|
| GB | 2052251 | 1/1981 |
| JP | 5084384 | 4/1993 |
| JP | 2000312798 | 11/2000 |
| JP | 2003079998 | 3/2003 |
| WO | WO 2005/010268 | 2/2005 |

OTHER PUBLICATIONS

PCT International Preliminary Report on Patentability, PCT/CN2004/000797, (translation).

PCT Written Opinion of International Searching Authority, PCT/CN2004/000797, (translation) Nov. 4, 2004.

Haier Appliances (India) P.Ltd, Press Release, Nov. 8, 2004.

Samsung Corp., "Washing Machine Certification," 4 pages; FAQ, 3 pages; "Silver Nano", 3 pages; "Silver Washing Machine Introduction," 3 pages; "Silver Nano Washing Machine Benefits," 3 pages; "Washing Machine Introduction," 3 pages. samsung.co.za/silvemano (believed to be prior to Oct. 27, 2005).

* cited by examiner

APPARATUS FOR TREATING WASH WATER SUPPLIED

TECHNICAL FIELD

The present invention relates to washing machines for laundry. More particularly, the present invention relates to apparatus to treat water supplied to washing machines for cleaning laundry and methods.

BACKGROUND

Cleaning of laundry and dirty clothing is a routine and regular activity and particularly for families of children. There are various cleaning processes including commercial laundry services, dry cleaning using special solutions and solvents, and at-home washing using conventional washing machines.

Often at-home washing of laundry involves the use of heated water and detergents, bleaches, special cleaning solutions, and other soil removing agents. The detergents and other soil removers typically have a significant amount of phosphates. While the use of these products results in cleaned and disinfected clothing, the products also have unsatisfactory problems. Particularly, phosphates are a significant water pollutant. The chlorine from bleaches also causes water pollution. Further, using heated water requires energy to heat the water, and heated water may cause fabrics to shrink. The detergents and heated water also damage the fabrics. Some persons also have allergic reactions to most detergents and must use a non-allergenic cleaning product. Bacteria may survive washing notwithstanding the use of detergents. Although washing machines have rinse cycles, not all of the detergent is removed. Residual detergent dulls fabric colors. Residual detergent also leaves a sticky surface on clothing that further attracts dust, grime, and contaminants. Fabrics lack volume and supplements may be used to provide a softer feel to the fabrics.

To address these problems, detergents have been developed that clean satisfactorily in cold water, and use supplemental oxidizers to assist with the detergent cleaning. However, for the reasons noted above, these developments have not met with universal acceptance.

Accordingly, there is a need in the art for improved apparatus for treating wash water supplied to washing machines for cleaning laundry and methods. It is to such that the present invention is directed.

SUMMARY

The present invention meets the needs in the art by providing a water treatment apparatus that activates wash water supplied to washing machines for cleaning clothing, in which a water treatment conduit has a water inlet capable of connecting to a supply of water and a water outlet capable of connecting to a water inlet of a washing machine for communicating treated wash water to a tub of the washing machine. A reactor chamber includes at least one UV lamp and a coated metal target capable of generating oxidizing gases in atmosphere upon exposure to light from the UV lamp. An injector communicates oxidizing gases generated in the reactor chamber into the water treatment conduit. A transparent conduit in a portion of the water treatment conduit provides for treatment of the oxidated gases in the water by illumination by the UV lamp. A disinfector inserts a disinfectant into the treated oxidated water passing through the water treatment conduit. A controller activates the UV lamp and the disinfector for operation during flow of water through the water treatment conduit.

In another aspect, the present invention provides a process of treating water for use in a laundry washing machine comprising the steps of:

(a) connecting a water treatment conduit between a supply of water and a water inlet of a washing machine for laundry;

(b) detecting a washing machine cycle for providing wash water to a tub of the washing machine;

(c) activating a UV lamp and a disinfector;

(d) injecting oxidation gases into the water in the water treatment conduit from a supply of oxidation gases generated by exposing a coated metal target in atmosphere with UV light;

(e) exposing the oxidated water in a transparent conduit portion of the water treatment conduit to UV light to provide treated oxidated water;

(e) injecting a disinfectant from the disinfector into the treated oxidated water; and (f) communicating the disinfected treated oxidated water from the water treatment conduit through the water inlet to a tub of the washing machine.

Objects, features and advantages of the present invention will become apparent upon a reading of the following detailed description in conjunction with the drawings and the appended claims.

DETAILED DESCRIPTION

Figure 1:
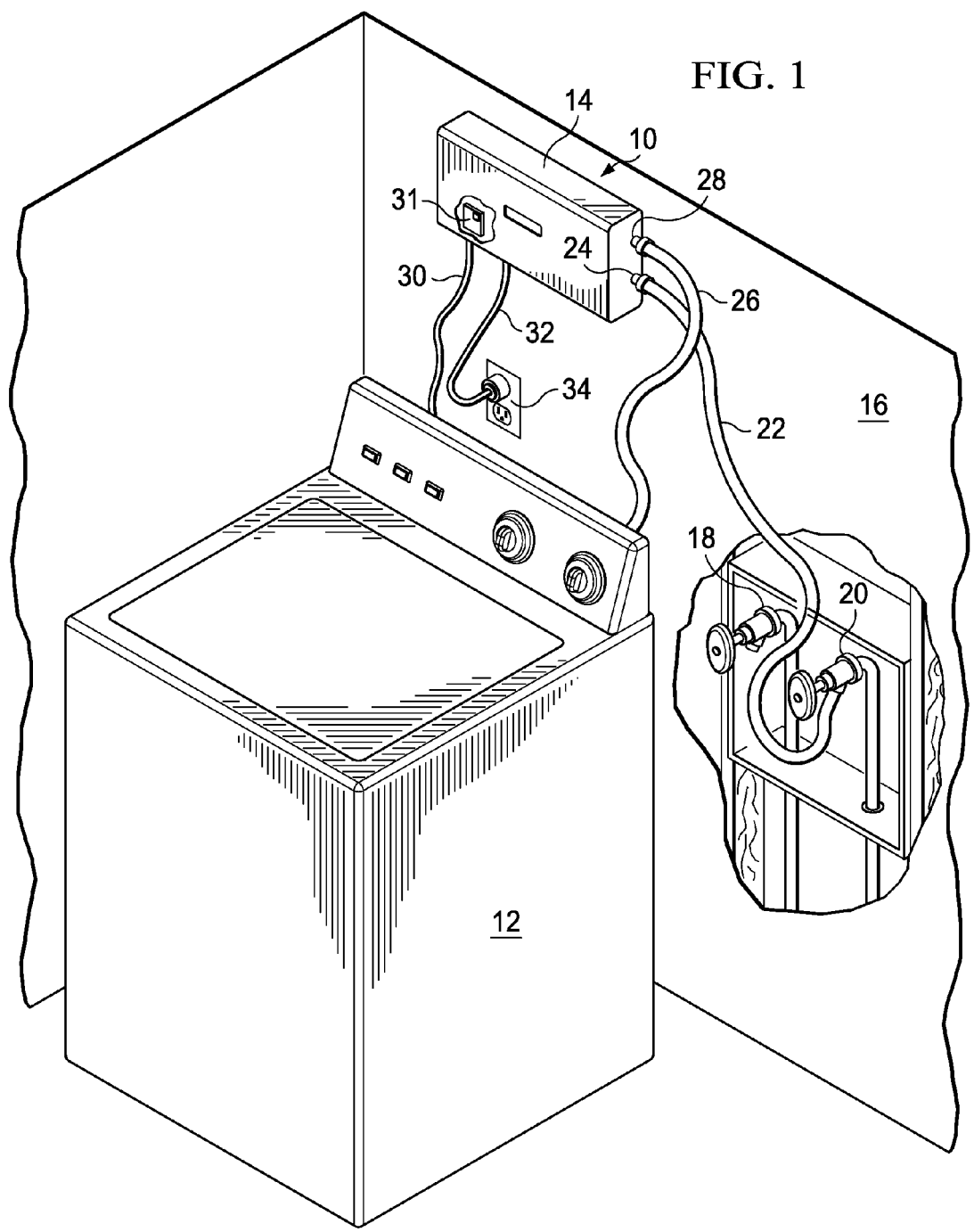
FIG. 1 is a perspective view of a water treatment apparatus according to the present invention configured for aftermarket installation and use in providing activated wash water for a conventional washing machine for cleaning laundry.

Referring now in more detail to the drawings, in which like reference numerals indicate like parts, FIG. 1 illustrates in perspective view a water treatment apparatus 10 according to the present invention configured for aftermarket installation and use in providing activated wash water for a conventional washing machine 12 for cleaning laundry. A housing 14 encloses the apparatus 10 and includes conventional slots or openings (not illustrated) for receiving fasteners to secure the housing to a wall 16 in a laundry room in proximity to the washing machine 12.

As illustrated in partially broken away view, a hot water supply generally 18 is shut off. A cold water supply 20 connects by a hose 22 to an inlet 24 of the apparatus 10. A hose 26 connects an outlet 28 from the apparatus 10 to an inlet connection of the washing machine 12. An electrical power supply cord 30 connects to a socket that communicates with a controller 31 of the apparatus 10. The apparatus 10 connects the controller 31 by a power cord 32 to an electrical outlet 34. The apparatus 10 accordingly connects between the washing machine 12 and the water supply 20 and the electrical supply 34.

Figure 2:
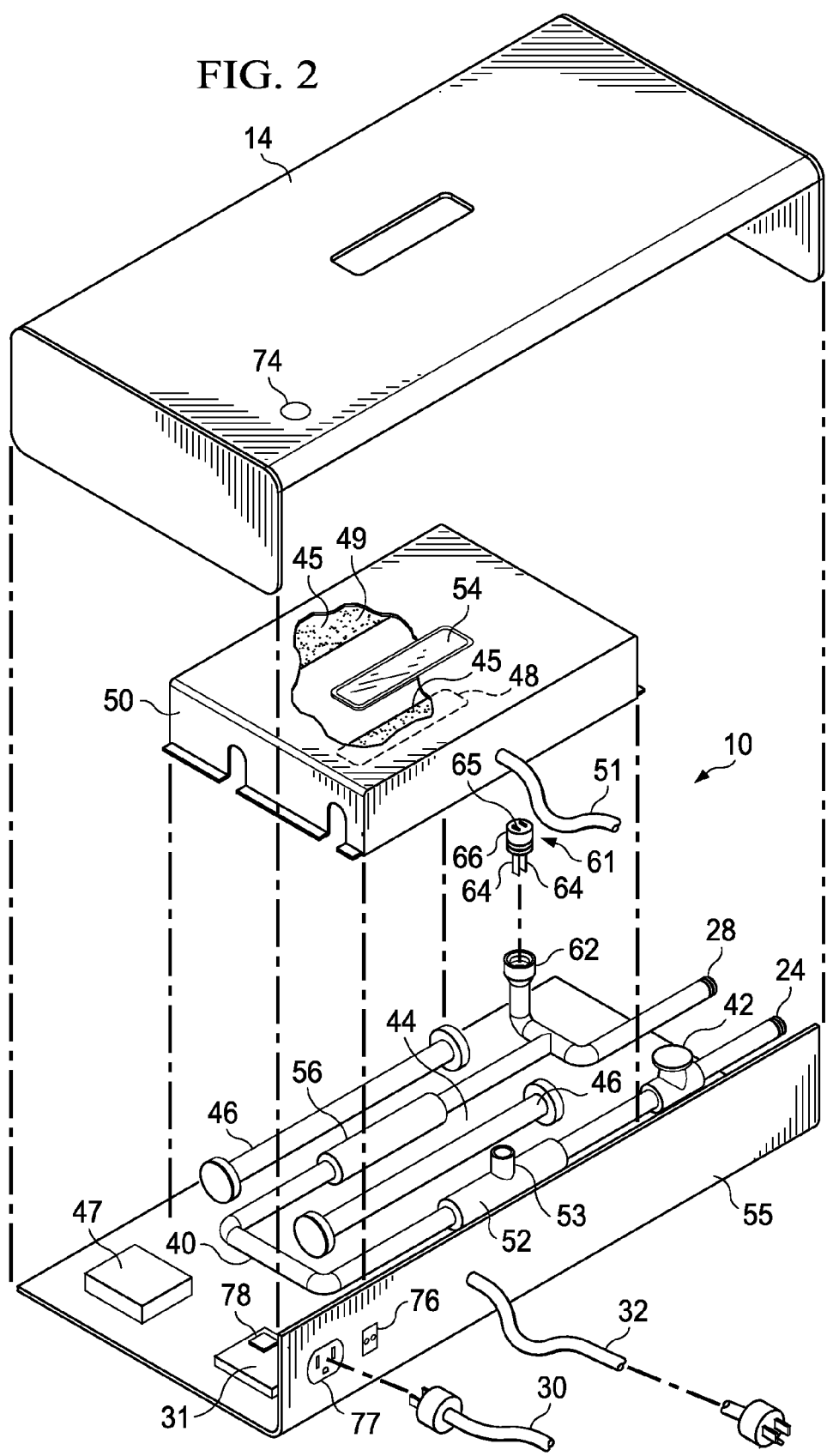
FIG. 2 is a perspective exploded view of the water treatment apparatus illustrated in FIG. 1.

FIG. 2 illustrates in perspective exploded view the water treatment apparatus 10 having a water treatment conduit 40. The inlet 24 connects to a valve 42. The valve is normally closed, but connects with control wires for selectively opening by the controller 31 as discussed below. A reactor chamber 44 includes at least one UV lamp 46 operated by a ballast 47 and a coated metal target generally 48 shown in cut-away view capable of generating oxidizing gases in ambient atmosphere upon exposure to light from the UV lamp. The target 48 is coated with a hydrated quad-metallic material 45 for generating the oxidizing gases. These oxidizing gases include ozone, ozonide ions, hydro peroxides, hydroxides, free oxygen molecules, and super oxide ions. For example, the photocatalytic material 45 comprises a titanium oxide or a metallic alloy that generates hydroxyl radicals in the presence of UV light, such as RCIC-5A, -9A, -9C, -9HOA, -9HOC, -11HOA, -11C, -14C, -14HOA, -14HOC, -36\5A, -36HOA, and -36UVA. Such material is available from RGF Environmental Group, Inc., of West Palm Beach, Fla.

A shroud 50 shown exploded away encloses the reactor chamber 44. Lateral side walls of the shroud 50 seat outwardly of the respective UV lamps 46 in the illustrated embodiment. Also illustrated in cut-away view in FIG. 2 is an alternate embodiment in which an interior surface of a shroud 50, for example, a surface 49 of a side wall, is coated with the hydrated quad-metallic material 45 to provide a greater surface area for generation of oxidating gases.

A tube 51 extends from the housing 50 to a suction port 53 of an injector 52. The tube 51 communicates with the reactor chamber 44. The oxidating gases communicate through the tube 51 and the suction port 53 to the injector 52 for injection into the water flowing in the water treatment conduit 40. One such injector is a MAZZEI injector providing high efficiency, differential pressure injection of the gases into the water flow through the suction port. A window 54 in the shroud 50 aligns with an opening in the housing 14. The window 54 allows a person operating the washing machine to observe light from the UV lamps and thus to observe the operation of the apparatus 10. In an alternate embodiment, a light pipe extends from the reactor chamber 44 through the housing 14. A distal end of the light pipe provides a visual signal that the reactor chamber 44 is operative. In the illustrated embodiment, the injector 52 and a portion of the water treatment conduit 40 sit outside the reactor chamber 44 between a side wall of the shroud and a wall 55 defining a side of the apparatus 10.

A transparent conduit 56 in a portion of the water treatment conduit 40 is disposed within the reactor chamber for illumination by the UV lamp. The conduit 56 is preferably made of quartz glass. The UV light treats the oxidated water. The UV light causes reactions with the oxidation gases entrained in the water, and causes the oxidation gases to breakdown into hydroxyl radicals and by products.

A disinfector generally 61 inserts a disinfectant product into the water flowing in the water treatment conduit 40 to provide sanitary treatment of laundry cleaned in the washing machine. In the illustrated embodiment, the disinfector 61 is a disinfectant ion generator that forms the disinfectant. The disinfectant ion generator 61 communicates through a connector tube 62 to the water in the water treatment conduit 40. In the illustrated embodiment, the disinfectant ion generator 61 is a silver ion generator that includes a pair of silver wires or plates 64 disposed in spaced-apart relation in a housing 66 illustrated exploded from the tube 62 in fluid communication with the water treatment conduit 40. The housing 66 of the silver ion generator removably connects such as by a threaded connection to the tube 62. The plates 64 connect through contacts 65 to a plug providing through the controller 31 a supply of alternating electrical current. Activation of the electrical current causes the silver plates 64 to release silver ions by electrolysis. In an alternate embodiment, the disinfector injects a disinfectant material from supply into the water.

The controller 31 controls the operation of the apparatus 10, including activating the UV lamp 46 during flow of water through the water treatment conduit 40, as well as activating the disinfector 61. In the illustrated embodiment, the controller 31 includes a counter that accumulates the duration of time that the silver ion generator 61 is operatively generating silver ions. A comparator checks the value of the accumulator against a predetermined value equal to the useful life provided by the silver plates 64 in typical operation. When the accumulated value exceeds the predetermined value, the controller illuminates a display light 74 to indicate that the silver plates 64 should be replaced.

Replacement of the silver plates 64 is accomplished by first disconnecting the contacts 65 from the plug. The housing 66 is removed from the tube 62 exposing the plates 64. The plates 64 are disconnected from the housing 66 and new plates installed. The housing is reattached to the tube 62 disposing the silver plates within the tube 62 and in fluid communication with water in the water treatment conduit 40. Connecting the plug to the contacts 65 restores the electrical power. A switch 76 communicates with the controller 31 to re-set the counter to zero.

The controller 31 includes a socket 77 that receives the plug of the power supply cord 30 of the washing machine 12. A sensor 78 communicates with the socket 77, and is configured to detect when the washing machine 12 is operative for filling with washing water. The electrical demand during the fill portion of a washing cycle is at a value greater than a non-operating electrical demand for the washing machine and less than the washing cycle of the washing machine. The sensor responds to the change in electrical demand by activating the reactor chamber 44 (that is, starting the UV lamp 46) and the silver ion generator 61.

In one embodiment, the sensor 77 is configured to discontinue illumination of the UV lamp 46 and operation of the silver ion generator 61 upon sensing that the washing machine 12 has completed the water-filling portion of an operational cycle. In another embodiment, a timer tracks the time the UV lamp and the silver ion generator are operating, and discontinues the supply of electrical current after a predetermined period.

The illustrated embodiment includes the valve 42 connected in-line with the cold water supply 20. The valve 42 is normally closed. The closed valve 42 prevents inadvertent water damage should the conduit 40 or the supply hose 26 develop a leak while the washing machine 12 is idle from its washing purposes. While a leak may develop during washing operations, it is believed that persons using washing machines are more attentive to such than when the machine is idle. The controller opens the valve 42 when the sensor 78 detects that the washing machine 12 has commenced operation. The valve 42 opens to permit the flow of cold water. The inlet valve internal to the washing machine 12 then controls the flow of water from the supply 20.

Some recently developed washing machines have electronic controls and may include a time display or other electronic feature that has a continuous demand for low electrical current. For such, the sensor 78 is configured for being taught a threshold of minimum current demand. During initialization of the controller 31, an initializer detects a nominal electrical current communicated to the washing machine 12 during a non-operational period with the washing machine connected to a supply of electrical current. The initializer sets the sensor 78 for this threshold. Subsequent to initialization the comparator in the controller 31 compares the threshold with an electrical demand during the washing machine cycle for supply of washing water to the tub of the washing machine for determining when to operate the apparatus 10.

With reference to FIG. 1, the water treatment apparatus 10 operates during wash water fill portions of the washing cycle of the washing machine 12. The apparatus 10 mounts to the wall in the laundry room. The hot water supply 18 is turned off, such a closing a valve in the supply line. The cold water supply hose 26 is disconnected from the cold water supply 20 and connected to the outlet 28 of the apparatus 10. The cold water supply hose 22 connects between the cold water supply 20 and the inlet 24 of the apparatus 10. The electrical power supply cord 30 for the washing machine 12 connects to the socket on the apparatus 10. The power cord 32 for the apparatus 10 connects to the electrical supply 34.

The water treatment apparatus 10 is ready for operation after being connected electrically between the electrical supply and the washing machine and between the cold water supply and the washing machine. The apparatus 10 is started and initialized. This is accomplished using the switch 76 that is configured for initialization as well as for resetting the counter of the silver plate usage to zero, as discussed above. Initialization occurs by pressing and holding the switch 76 for a short period. The apparatus 10 senses the electrical demand and sets the threshold. This is done by incrementally lowering the value of the threshold until the apparatus 10 starts the UV lamps 46 and the ion generator 61. Several training sessions may be required. If the apparatus 10 does not cease operation after a washing cycle, the switch 76 is operated and held again. The initializer increases the threshold incrementally until the apparatus turns off.

Upon starting the washing machine 12, the sensor 78 detects a washing machine cycle for providing wash water to a tub of the washing machine. This is triggered by a change from the threshold demand by the washing machine 12 for electrical current as monitored by the sensor 78. Upon detecting the demand for operation of the washing machine, the controller 31 activates the UV lamp 46 and the disinfecting ion generator 61. In the embodiment using the valve 42, the controller also opens the valve.

The UV lamp 46 emits UV light that reacts with the coating on the target 48 to form oxidating gases in the atmosphere of the reactor chamber 44. These oxidiating gases include ozone, ozonide ions, hydro peroxides, hydroxides, free oxygen molecules, and super oxide ions. The reactor chamber 44 is open to communication with ambient air.

The disinfecting ion generator 61 being supplied with electrical current begins electrolysis for generating silver ions. As the washing machine 12 cycles, the inlet valve in the washing machine opens to communicate water to the tub. Water may thereby flow from the supply 20 through the inlet 24 of the conduit 40 upon demand from the washing machine 12 for water during a fill portion of the washing cycle.

The pressurized water flows through the conduit 40 and the differential pressure injector 52. The suction port 53 communicates the ambient air including the oxidizing gases in the reactor chamber 44 through the tube 51 into the injector 52. The differential pressure causes the oxidizing gases to be injected into the water in the water treatment conduit 40. The oxidated water passes through the transparent portion 56 of the conduit and is exposed to UV light. The UV light treats the oxidated water, by causing reactions with the oxidation gases entrained in the water, and a portion of the oxidation gases are broken down into hydroxyl radicals and byproducts.

The silver ions generated in the disinfection ion generator 61 communicate through the tube 62 into the treated oxidated water in the conduit 40. The disinfected treated oxidated water communicates from the outlet 28 to the water inlet of the washing machine 12 for flowing to the tub.

The counter in the controller 31 accumulates the duration of operation of the disinfecting ion generator 61. After the apparatus 10 is turned off, the comparator compares the value of the counter to a predetermined value. The controller 31 activates the display light 74 if the value of the counter exceeds the predetermined value. This signals the user that the silver plates 64 require changing to maintain effective disinfecting activity in laundry in which the silver ions become deposited. Replacement of the silver plates 64 is discussed above.

The activated treated water communicates into the tub during the fill portion of the washing cycle. The oxidating gases and hydroxyls break down dirt, oils, heavily soiled contaminants on clothing, and stains, during the washing portion of the washing cycle using cold water. A byproduct of generating oxidating gases is oxygen aeration. This enhances any enzymatic action such as enzymes included in the washing machine as a supplement for cleaning particularly heavy stains. The aeration also creates an effervescent cleaning action for release of grime and stains from fabric. The silver ions provide bactericide action on the laundry, and by remaining in the clothing also provide wearing protection against odor-causing bacteria. The rinse cycle provides additional oxidating gases and silver ions to the water in the tub.

The present invention accordingly provides an apparatus and method for providing activated wash water to washing machines and particularly for aftermarket washing machines. The principles, preferred embodiments, and modes of operation of the present invention have been described in the foregoing specification. The invention is not to be construed as limited to the particular forms disclosed as these are regarded as illustrative rather than restrictive. Moreover, variations and changes may be made by those skilled in the art without departing from the spirit of the invention described in the following claims.

What is claimed is:

1. A water treatment apparatus for providing activated wash water to washing machines for cleaning clothing, comprising:

a water treatment conduit having a water inlet capable of connecting to a supply of water and a water outlet capable of connecting to a water inlet of a washing machine for communicating treated wash water to a tub of the washing machine;

a reactor chamber comprising:
at least one UV lamp; and
a coated metal target capable of generating oxidizing gases in atmosphere upon exposure to light from the UV lamp;

an injector for communicating oxidizing gases generated in the reactor chamber into the water treatment conduit;

a transparent conduit in a portion of the water treatment conduit disposed for illumination by the UV lamp to treat the oxidated water;

a disinfector configured for inserting a disinfectant into the treated oxidated water passing through the water treatment conduit;

a controller for activating the UV lamp and the disinfector during flow of water through the water treatment conduit; and wherein the disinfector comprises a disinfectant ion generator capable of inserting silver ions into the treated oxidated water passing through the water treatment conduit.

2. The water treatment apparatus as recited in claim 1, further comprising a counter that accumulates the duration of time that the disinfecting ion generator is operatively generating silver ions and further comprising a display that is activated upon the counter exceeding a predetermined value.

3. The water treatment apparatus as recited in claim 2, further comprising a reset device for setting the counter to a threshold value less than the predetermined value upon replacement of the disinfecting ion generator.

4. The water treatment apparatus as recited in claim 2, wherein the disinfecting ion generator comprises:
   a pair of silver wires disposed in spaced-apart relation in a housing that communicates with the water treatment conduit;
   a supply of alternating electrical current connected to the silver wires, whereupon activation of the electrical current causes the silver wires to release silver ions by electrolysis.

5. The water treatment apparatus as recited in claim 1, further comprising a sensor connected to the electrical supply for the washing machine and capable of detecting when the washing machine is operative for filling with washing water and in response thereto activating the reactor chamber and the disinfector.

6. The water treatment apparatus as recited in claim 5, wherein the sensor discontinues illumination of the UV lamp and operation of the disinfector upon sensing that the washing machine discontinued the wash water filling portion of an operational cycle.

7. The water treatment apparatus as recited in claim 1, wherein the controller connects to a supply of electrical current and further comprises a socket communicating with the controller for receiving an electrical plug of the washing machine, whereby electrical demand by the washing machine during operative cycles is detected by current flowing from the supply through the controller to the washing machine.

8. The water treatment apparatus as recited in claim 1, wherein the transparent conduit comprises quartz glass.

9. The water treatment apparatus as recited in claim 1, further comprising a monitor for operation of the disinfector, comprising:
   a timer capable of tracking a duration of use of the disinfector;
   an accumulator for accumulating the durations of periodic operation of the disinfector;
   a comparator that compares the value of the accumulator with a predetermined value; and
   a display that is activated upon the value of the accumulator exceeding the predetermined value.

10. The water treatment apparatus as recited in claim 9, further comprising a set device to set the accumulator to an initial value less than the predetermined value upon replacement of the disinfectant ion generator.

11. The water treatment apparatus as recited in claim 1, further comprising a valve connected between the supply of water and the water inlet of the water treatment conduit, the valve selectively operated by the controller upon detection of electrical demand by the washing machine during a wash water supply portion of an operation cycle of the washing machine.

12. The water treatment apparatus as recited in claim 1, further comprising an initializer for setting the controller to operate the water treatment apparatus, the initializer configured for detecting a nominal electrical current communicated to the washing machine during a non-operational period with the washing machine connected to a supply of electrical current, so subsequent to initialization the controller compares the threshold with an electrical demand during the washing machine cycle for supply of washing water to the tub of the washing machine for determining when to operate the apparatus.

13. The water treatment apparatus as recited in claim 12, further comprising a selectively actuated valve disposed between the supply of water and the water inlet of the water treatment conduit, the valve normally closed and selectively opened upon detection by the controller of the washing water supply portion of the washing machine cycle.

14. A water treatment apparatus for providing activated wash water to washing machines for cleaning clothing, comprising:
   a water treatment conduit having a water inlet capable of connecting to a supply of water, a water outlet capable of connecting to a water inlet of a washing machine for communicating treated wash water to a tub of the washing machine, and an intermediate transparent portion;
   a reactor chamber open to atmosphere comprising:
       at least one UV lamp disposed in light communicative relation to the transparent portion of the water treatment conduit for exposing oxidated water to UV light; and
       a coated metal target capable of generating oxidizing gases in atmosphere upon exposure to light from the UV lamp;
   an injector for communicating oxidizing gases generated in the reactor chamber into the water treatment conduit to oxidate the water therein;
   a disinfecting ion generator that injects disinfecting ions into the flow of treated oxidated water passing through the water treatment conduit;
   a controller for activating the UV lamp and the disinfecting ion generator during flow of water through the water treatment conduit; and
   an initializer for setting the controller to operate the UV lamp and disinfecting ion generator, the initializer configured for detecting a nominal electrical current communicated to the washing machine during a non-operational period with the washing machine connected to a supply of electrical current, so subsequent to initialization the controller compares the threshold with an electrical demand during the washing machine cycle for supply of washing water to the tub of the washing machine for determining when to operate the UV lamp and the disinfecting ion generator.

15. The water treatment apparatus as recited in claim 14, wherein the disinfecting ion generator comprises an electrolysis device having a pair of silver plates connected to a supply of electrical current for generating silver ions that inject therefrom into the flow of treated oxidated water passing through the water treatment conduit.

16. The water treatment apparatus as recited in claim 15, further comprising a counter that accumulates the duration of time that the disinfecting ion generator is operatively generating ions and further comprising a display that is activated upon the counter exceeding a predetermined value.

17. The water treatment apparatus as recited in claim 16, further comprising a reset device for setting the counter to a threshold value less than the predetermined value upon replacement of the disinfecting ion generator.

18. The water treatment apparatus as recited in claim 14, wherein the controller connects to a supply of electrical current and further comprises a socket communicating with the controller for receiving an electrical plug of the washing machine, whereby electrical demand by the washing machine during operative cycles is detected by current flowing from the supply through the controller to the washing machine.

19. The water treatment apparatus as recited in claim 14, wherein the transparent portion of the water treatment conduit comprises quartz glass.

20. The water treatment apparatus as recited in claim 14, further comprising a selectively actuated valve disposed between the supply of water and the water inlet of the water treatment conduit, the valve normally closed and selectively opened upon detection by the controller of the washing water supply portion of the washing machine cycle.

21. A process of treating water for use in a laundry washing machine comprising the steps of:
   (a) connecting a water treatment conduit between a supply of water and a water inlet of a washing machine for laundry;
   (b) detecting a washing machine cycle for providing wash water to a tub of the washing machine;
   (c) activating a UV lamp and a disinfector;
   (d) injecting oxidation gases into the water in the water treatment conduit from a supply of oxidation gases generated by exposing a coated metal target in atmosphere with UV light;
   (e) exposing the oxidated water in a glass conduit portion of the water treatment conduit to UV light to provide treated oxidated water;
   (f) injecting disinfecting silver ions from the disinfector into the treated oxidated water, the silver ions generated by electrolysis of a pair of silver wires held in a housing that communicates with the water treatment conduit; and
   (g) communicating the disinfected treated oxidated water from the water treatment conduit through the water inlet to a tub of the washing machine.

22. The method as recited in claim 21, further comprising the steps of:
   accumulating the duration of operation of the disinfector in a counter; comparing the value of the counter to a predetermined value after an operational cycle of the washing machine; and
   activating a signal when the value of the counter exceeds the predetermined value.

23. The method as recited in claim 21, further comprising initializing a controller to operate the UV lamp and disinfector by the steps of:
   detecting a nominal electrical current communicated to the washing machine during a non-operational period with the washing machine connected to a supply of electrical current; and
   setting a threshold of electrical demand based on the nominal electrical current in order to compare the threshold with an electrical demand during the washing machine cycle for supply of washing water to the tub of the washing machine during step (b) detecting the washing machine cycle for providing wash water to the tub.

24. The water treatment apparatus as recited in claim 1, further comprising a washing machine that communicates with the water treatment conduit.

25. The water treatment apparatus as recited in claim 14, further comprising a washing machine that communicates with the water treatment conduit.

\* \* \* \* \*